US012073507B2

(12) United States Patent
Xu et al.

(10) Patent No.: US 12,073,507 B2
(45) Date of Patent: Aug. 27, 2024

(54) POINT-BASED NEURAL RADIANCE FIELD FOR THREE DIMENSIONAL SCENE REPRESENTATION

(71) Applicant: Adobe Inc., San Jose, CA (US)

(72) Inventors: Zexiang Xu, San Jose, CA (US); Zhixin Shu, San Jose, CA (US); Sai Bi, San Jose, CA (US); Qiangeng Xu, Los Angeles, CA (US); Kalyan Sunkavalli, San Jose, CA (US); Julien Philip, London (GB)

(73) Assignee: Adobe Inc., San Jose, CA (US)

( * ) Notice: Subject to any disclaimer, the term of this patent is extended or adjusted under 35 U.S.C. 154(b) by 100 days.

(21) Appl. No.: 17/861,199

(22) Filed: Jul. 9, 2022

(65) Prior Publication Data

US 2024/0013477 A1 Jan. 11, 2024

(51) Int. Cl.
*G06T 15/20* (2011.01)
*G06T 15/06* (2011.01)
*G06T 15/80* (2011.01)

(52) U.S. Cl.
CPC ............ *G06T 15/205* (2013.01); *G06T 15/06* (2013.01); *G06T 15/80* (2013.01); *G06T 2207/10028* (2013.01)

(58) Field of Classification Search
CPC ....... G06T 15/205; G06T 15/06; G06T 15/80; G06T 2207/10028
See application file for complete search history.

(56) References Cited

U.S. PATENT DOCUMENTS

2019/0311546 A1* 10/2019 Tay ...................... G05D 1/0088
2020/0271451 A1* 8/2020 Carrigg ................ G05D 1/0214

OTHER PUBLICATIONS

"Nerf: Representing scenes as neural radiance fields for view synthesis." Communications of the ACM 65.1 (2021): 99-106 (Year: 2021).*
Huang et al., DeepMVS: Learning Multi-view Stereopsis, In Proceedings of the IEEE Conference on Computer Vision and Pattern Recognition, Jun. 2018, pp. 2821-2830.
Kajiya et al., Ray Tracing Volume Densities, ACM SIGGRAPH Computer Graphics, vol. 18, No. 3, Jul. 1984, pp. 165-174.

(Continued)

*Primary Examiner* — Xin Sheng
(74) *Attorney, Agent, or Firm* — Kilpatrick Townsend & Stockton LLP

(57) ABSTRACT

A scene modeling system receives a plurality of input two-dimensional (2D) images corresponding to a plurality of views of an object and a request to display a three-dimensional (3D) scene that includes the object. The scene modeling system generates an output 2D image for a view of the 3D scene by applying a scene representation model to the input 2D images. The scene representation model includes a point cloud generation model configured to generate, based on the input 2D images, a neural point cloud representing the 3D scene. The scene representation model includes a neural point volume rendering model configured to determine, for each pixel of the output image and using the neural point cloud and a volume rendering process, a color value. The scene modeling system transmits, responsive to the request, the output 2D image. Each pixel of the output image includes the respective determined color value.

20 Claims, 8 Drawing Sheets

(56) References Cited

OTHER PUBLICATIONS

Liu et al., Neural Sparse Voxel Fields, Available online at https://arxiv.org/pdf/2007.11571.pdf, 2020, pp. 1-22.

Lombardi et al., Neural Volumes: Learning Dynamic Renderable Volumes from Images, ACM Transactions on Graphics, vol. 38, No. 4, Jul. 2019, pp. 1-14.

Martin-Brualla et al., NeRF in the Wild: Neural radiance fields for Unconstrained Photo Collections, In Proceedings of the IEEE/CVF Conference on Computer Vision and Pattern Recognition, Jun. 2021, pp. 7210-7219.

Mildenhall et al., NeRF: Representing Scenes as Neural Radiance Fields for View Synthesis, European Conference on Computer Vision, Aug. 3, 2020, pp. 1-25.

Schonberger et al., Pixelwise View Selection for Unstructured Multi-View Stereo, European Conference on Computer Vision (ECCV), Oct. 2016, pp. 1-17.

Zhang et al., NeRF++: Analyzing and Improving Neural Radiance Fields, Available online at https://arxiv.org/pdf/2010.07492.pdf, Oct. 21, 2020, pp. 1-9.

* cited by examiner

Neural Point Generation
(e.g. using point cloud generation module 210)

Point-NeRF Representation with Volume Rendering.
(e.g. using point based neural rendering module 215)

The point query process.

US 12,073,507 B2

POINT-BASED NEURAL RADIANCE FIELD FOR THREE DIMENSIONAL SCENE REPRESENTATION

TECHNICAL FIELD

This disclosure generally relates to machine learning techniques for three-dimensional (3D) scene modeling. More specifically, but not by way of limitation, this disclosure relates to machine learning models for 3D scene modeling using neural point clouds.

BACKGROUND

Conventional neural radiance field (NeRF) networks can generate views of a 3D scene from a set of 2D images. NeRF networks can generate, given any view coordinates (e.g. an input spatial location and viewing direction), a view of the 3D scene.

SUMMARY

The present disclosure describes techniques for generating, based on input images and using a point-based NeRF scene representation model, a 3D scene. A scene modeling system receives two-dimensional (2D) images corresponding to views of an object and a request to display a three-dimensional (3D) scene that includes the object. The scene modeling system generates an output 2D image for a view of the 3D scene by applying a scene representation model to the input 2D images. The scene representation model includes a point cloud generation model to generate a neural point cloud representing the 3D scene from the 2D images. The scene representation model includes a neural point volume rendering model to determine a color value for each pixel of the output image. The scene representation model determines the color density value using the neural point cloud and a volume rendering process. The scene modeling system transmits the output 2D image responsive to the request.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
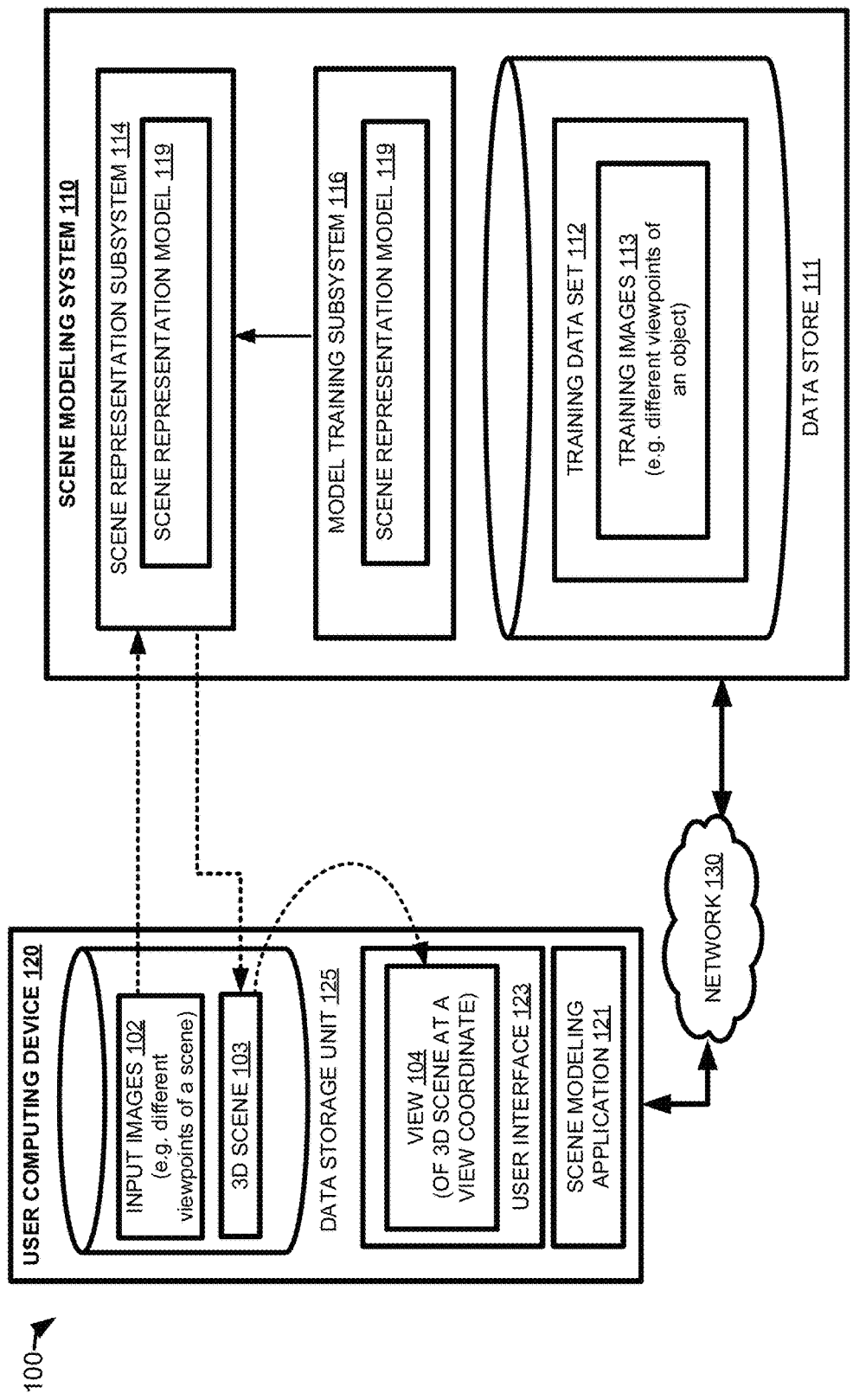
FIG. 1 depicts an example of a computing environment for generating, based on input images and using a scene representation model, a three-dimensional scene, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional scene modeling systems by providing a machine learning model that uses a neural point cloud to render a 3D scene, wherein the 3D scene can be used for modifying online computing environments or other systems. An scene modeling system is typically a network-based computing system including network-connected servers configured to offer a service (e.g. via a website, mobile application, or other means) allowing end users (e.g., consumers) to interact with the servers using network-connected computing devices (e.g. personal computers and mobile devices) to upload multiple two-dimensional (2D) images of an object (e.g. a vehicle, furniture, a house, merchandise, etc.) and to request a 3D scene (e.g. the object within a 3D environment) which can be displayed via computing devices from multiple camera views. In some instances, the request can include a view coordinate defining a spatial location and viewing direction for a camera view of the 3D scene. In some instances, end users can change view coordinates and a display of the 3D scene can be updated to a subsequent camera view.

Conventional scene modeling systems use ray marching techniques which select, for particular view of the 3D scene, shading points along rays (e.g. originating from a camera lens) projected through each pixel of an output image defining the particular view. Conventional scene modeling systems also perform volumetric rendering based on the shading points to determine a color value for each pixel. However, since object(s) in a scene generally do not occupy an entire space of a 3D scene, conventional ray marching techniques unnecessarily sample shading points at locations corresponding to empty space within the 3D scene, which leads to long reconstruction times for an output image of the 3D scene and slow per-scene network training. Further, conventional NeRF-based scene models depend on a per-scene fitting and are not adaptable to generate multiple 3D scenes via a single model.

Certain embodiments described herein improve the an accuracy of conventional NeRF-based models used in scene modeling systems by, for example, (1) generating a neural point cloud that uses neural points to approximate object geometry within the scene and model a continuous volumetric radiance field of the scene and (2) selecting shading points along rays for generation of output image pixels that are in a proximity to neural points of the neural point cloud. The scene representation model described herein confines, for a pixel of an output image defining a view of a 3D scene, shading points along the ray associated with the pixel to locations along the ray where neural points exist within a neighborhood (e.g. within a threshold radius of) the shading point. The neural point clouds generated via the model and the methods described herein adapt to object surfaces within the scene and, accordingly, the method and model described herein avoids setting shading points in an empty area of the 3D scene, resulting in more accurate color values determined for pixels of an output image defining a view of the 3D scene. Accordingly, the sample selection methods used by the model and methods described herein increase an accuracy of pixels generated for output views of the 3D scene because shading point locations selected via the model and methods described herein are more likely than conventionally-sampled shading points to be proximate to object surface locations within the 3D scene. Further, certain embodiments described herein decrease a rendering time for generating views of a 3D scene by training the model across multiple scenes, using multiple sets of input 2D image data, to accurately generate neural point clouds for 3D scenes. The ability of the model described herein to be trained across multiple scenes to generate neural point clouds can reduce a number of iterations of the model necessary to generate an output image for views of a new, subsequent 3D scene from a subsequent set of 2D image data.

The following non-limiting example is provided to introduce certain embodiments. In this example, an scene modeling system that implements a scene representation model receives input 2D images captured of an object (or set of objects) from multiple camera views and a request to generate a 3D scene. The object could be of a vehicle. The input images may be received from a user computing device (e.g. a mobile device, a tablet device, a laptop computer, or other user computing device). For example, a user of the user computing device captures images of the physical vehicle from multiple locations and/or camera view angles.

Continuing with this example, the scene modeling system applies a scene representation model to the input 2D images to generate a view of a 3D scene. The view is defined by view coordinates (e.g. a camera location within the 3D scene and a camera viewing angle). In some instances, the view is associated with predefined view coordinates (e.g. a default view is a frontal view at a location 10 meters from the vehicle or other object). In some instances, the view is defined or requested by the user and the scene modeling system generates the view of the 3D scene based on the view coordinates provided by the user. The scene modeling system generates a view of a 3D scene including the vehicle or other object that is the subject of the 2D input images. The scene representation model is configured to generate, based on the 2D input images, a neural point cloud representing the 3D scene. The neural point cloud includes neural points and, in some instances, the neural points correspond to locations of surfaces of the vehicle or other object. The scene representation model uses a ray marching technique to generate color values for pixels of an output image defining the view of the 3D scene. The ray marching technique includes a shading point selection algorithm that only selects shading points along the ray which are within a proximity to neural points of the neural point cloud.

Continuing with this example, the scene modeling system transmits the output image defining the view of the 3D scene responsive to the request. For example, the scene modeling system transmits the output image defining the view of the 3D scene to the user computing device from which the scene modeling system received the request to generate the 3D scene. In some embodiments, the scene modeling system receives a request, from the user computing device, to change the view of the 3D scene from the view to a subsequent view (e.g. associated with subsequent view coordinates) and generates a subsequent output image defining the subsequent view of the 3D scene.

Example Operating Environment for Generating Based on Input Images and Using a Scene Representation Model, a Three-Dimensional Scene Referring now to the drawings, FIG. 1 depicts an example of a computing environment 100 for generating, based on input images 102 and using a scene representation model 119, a 3D scene 103. The computing environment 100 includes scene modeling system 110, which can include one or more processing devices that execute a scene representation subsystem 114 and a model training subsystem 116. In certain embodiments, the scene representation subsystem 114 is a network server or other computing device connected to a network 130. The scene representation subsystem 114 applies a scene representation model 119 to input images 102 received from a user computing device 110 (or other client system) to generate a 3D scene 103. The user computing device 110 displays a view 104 of the 3D scene 103 associated with a view coordinate (e.g. a camera position and a viewing direction of the camera). For example, applying the scene representation model 119 includes applying a point cloud generation model to the input images 102 to generate a neural point cloud 301 that approximates object geometry within the 3D scene, and based on the neural point cloud 201, a point-based neural rendering model can provide 3D scene views corresponding to input view coordinates defining a position and viewing direction of a camera. Further details about the point cloud generation model and the point-based neural rendering model are described in FIG. 2.

The one or more processing devices of the scene modeling system 110 can further execute a model training subsystem 116 for training the scene representation model 119 that is used for generating the 3D scene. The scene modeling system 110 transmits the 3D scene to the user computing device 110 via the network 130 and the user computing device 110 stores the 3D scene in the data storage unit 125. The scene modeling system 110 further includes a data store 111 for storing data used in the generation of the 3D scene 103, such as the training data set 112.

The scene representation subsystem 114 and the model training subsystem 116 may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the scene modeling system 110 can be implemented using more or fewer systems or subsystems than those shown in FIG. 1, may combine two or more subsystems, or may have a different configuration or arrangement of the systems or subsystems.

The scene representation subsystem 114 is configured to receive or otherwise access input images 102. The input images 102, in some instances, are captured by the user computing device 120 and provide different views of an object. In some instances, the input images 102 are provided to the scene representation subsystem 114 by the user computing device 120 executing a scene modeling application 121. In certain examples, a user uploads the input images 102 and the user computing device 120 receives the input images 102 and transmits, via the network 130, the input images 102 to the scene representation subsystem 114. In certain examples, the user uploads or otherwise selects the input images 102 via a user interface 123 of the user computing device 120 (e.g., using the scene modeling application 121). In some instances, the scene modeling application 121 receives and communicates the selection of the input images 102 to the scene representation subsystem 114 via the network 130. In some instances, the scene modeling system 110 provides, for download by the user computing device 120, the scene modeling application 121. In some instances, the scene modeling application 121 displays a request to upload or otherwise select a set of input images 102, which could read "Please upload/select images." The image modeling application 121 receives a selection of the input images 102.

In some instances, the scene representation subsystem 114 receives the set of input images 102 corresponding to a set of views of the object and a request to display a 3D scene 103 that includes the object. The scene representation subsystem 114 and/or the scene modeling application 129 is able to render multiple views of the 3D scene 103 using a volume rendering process. In some instances, the user inputs a view coordinate for display of a view 104 of the 3D scene corresponding to the view coordinate. For example, the view coordinate defines a position and orientation of a camera within the 3D scene for display of the view 104.

Figure 5:
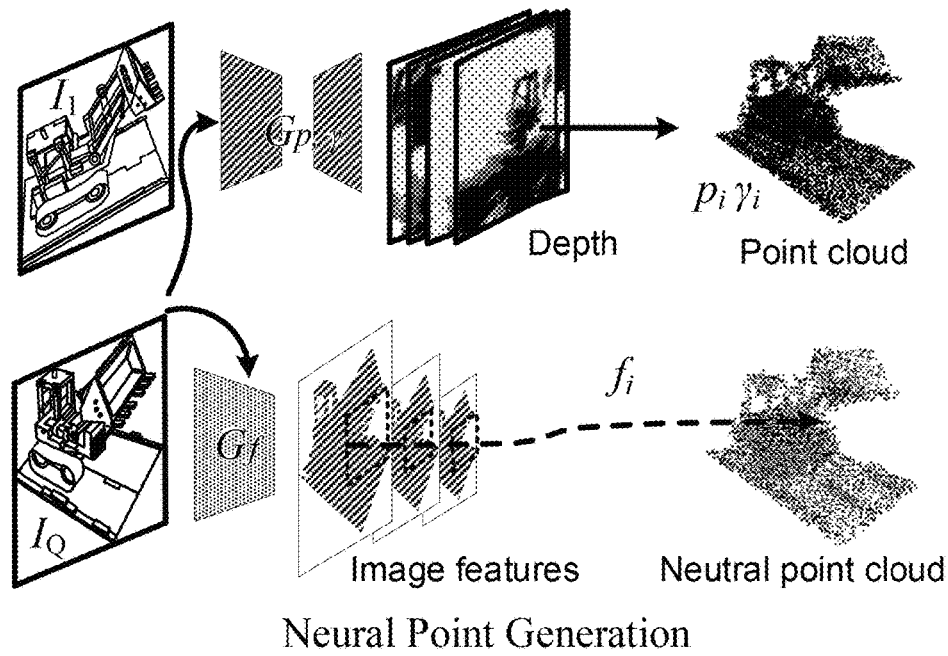
FIG. 5 depicts an illustration of generating a neural point cloud based on input images using the method of FIG. 4, according to certain embodiments disclosed herein.
Figure 6:
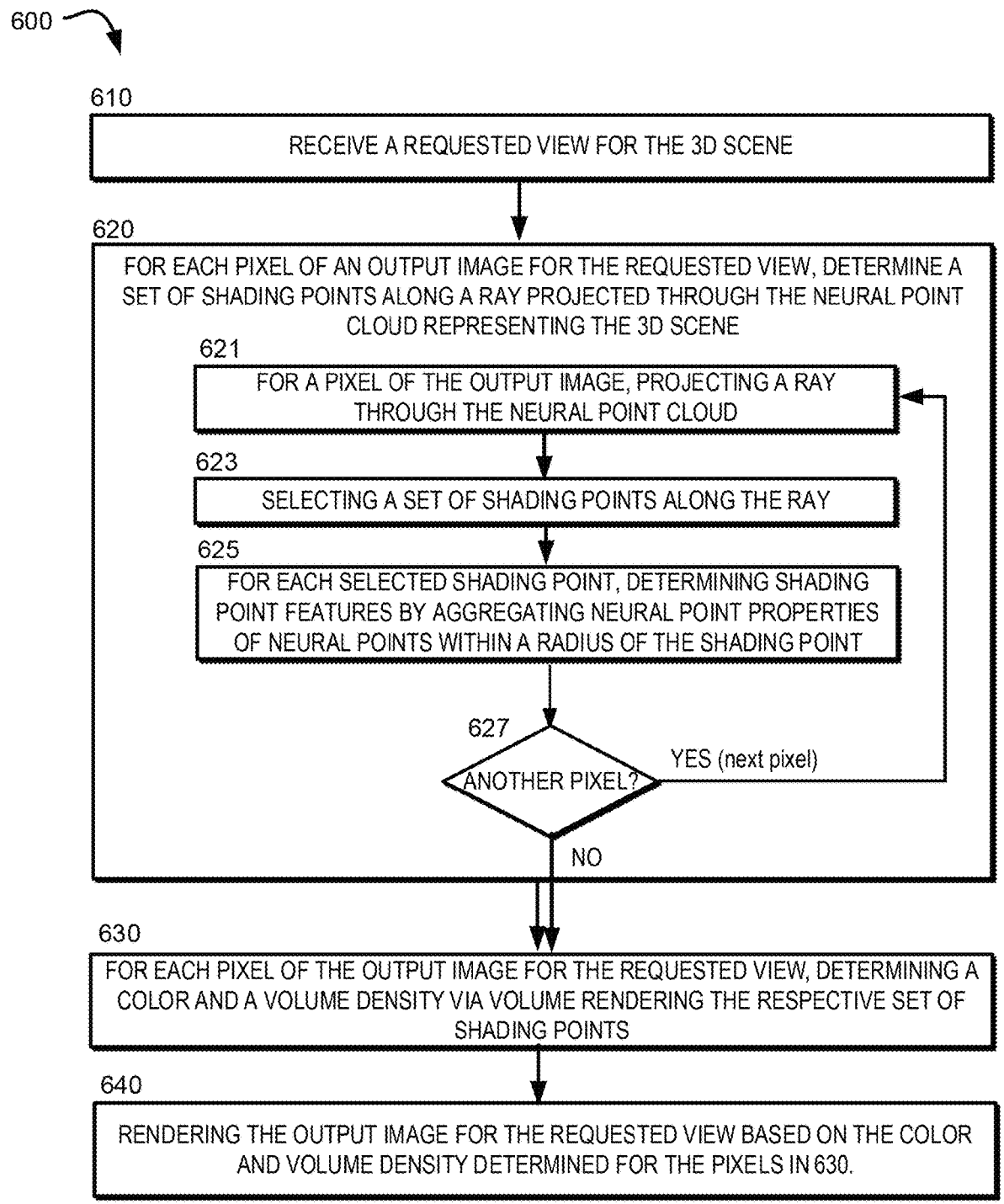
FIG. 6 depicts a method for rendering an output image depicting a view of a 3D scene, according to certain embodiments disclosed herein.

To generate the 3D scene 103, the scene representation subsystem 114 employs a scene representation model 119. Additional details about generating the 3D scene 103 by applying a scene representation model 119 are provided below with respect to FIG. 2 and FIG. 3. Additional details about applying a neural point cloud generation model to generate a neural point cloud are provided below with respect to FIG. 4 and FIG. 5. Additional details about rendering an output image depicting a view of a 3D scene are provided below with respect to FIG. 6 and FIG. 7. Additional details about aggregating neural point features for a shading point, which can be used in the method described in FIG. 6, are provided below with respect to FIG. 8.

The scene modeling system 110 trains the scene representation model 119 using the model training subsystem 116. The model training subsystem 116 builds and trains the scene representation model 119. The model training subsystem 116, using a training data set 112 (e.g. a set of training images 113 of different views of an object), trains scene representation model 119. In certain embodiments, training the scene representation model 119 includes training the point cloud generation model 210 along with the point-based neural rendering model 215, from end to end with a volume rendering loss 203. For example, a color value determined for an output view 104 of the 3D scene 103 is compared to a ground truth pixel value (e.g. of an input image 102) to determine the volume rendering loss 203. During a training period, the scene modeling system 110 updates parameters of one or more of the point cloud generation model 210 along with the point-based neural rendering model 215 to minimize the volume rendering loss 203. Training the scene representation model 119 in this why allows the scene representation model 119 to produce reasonable initial radiance fields and initializes the point cloud generation model 210 and the point-based neural rendering model 215 with reasonable weights, which significantly reduces a per-scene fitting time. The trained scene representation model 119 can output a reasonable initial point-based radiance field for a novel scene and, through differentiable ray marching, the radiance field for a specific scene can be further improved by optimizing the neural point cloud (point features and point confidence) and the point cloud generation model 210 and the point-based neural rendering model 215 for the specific scene. In various examples, the model training subsystem 116 can be implemented as one or more of program code, program code executed by processing hardware (e.g., a programmable logic array, a field-programmable gate array, etc.), firmware, or some combination thereof.

Example of an Image Modification Model

Figure 2:
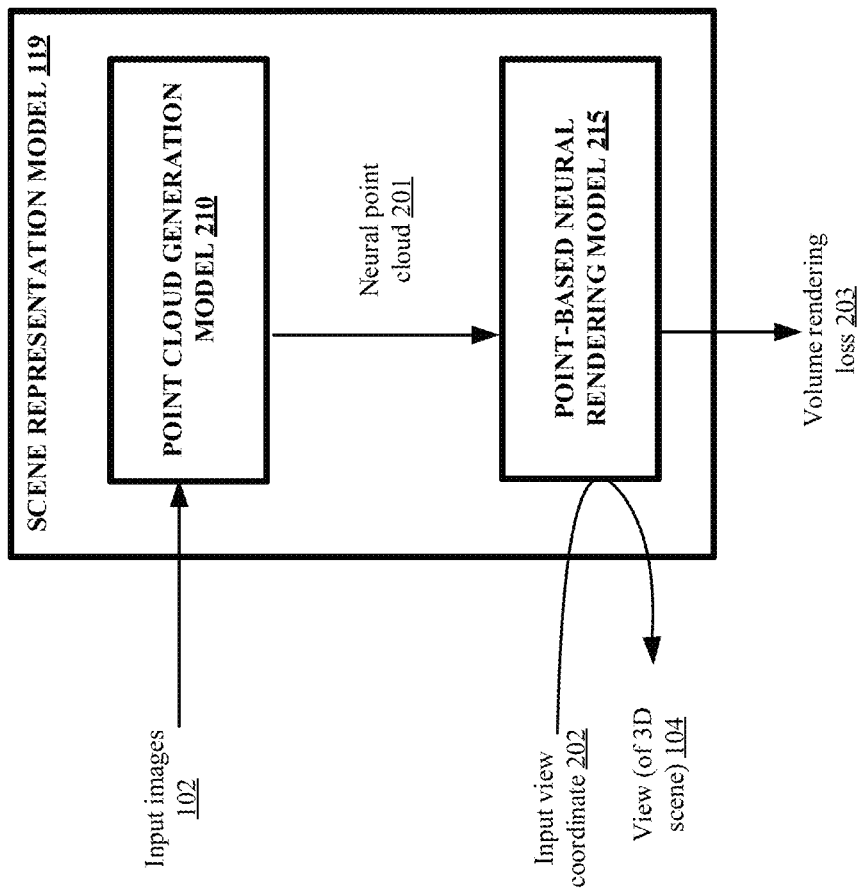
FIG. 2 depicts an example illustration of a scene representation model for use in the computing environment of FIG. 1, according to certain embodiments disclosed herein.

FIG. 2 depicts an illustration of a scene representation model 119 for use in certain embodiments described herein, for example as described FIGS. 1 and 3-9. As depicted in FIG. 2, the scene representation model 119 includes a point cloud generator model 210 and a point-based neural rendering model 215. An example process for applying the scene representation model 119 to input images 102 is described in FIG. 3. In certain examples, as depicted in FIG. 2, the scene representation model 119 receives 2D input images 102, for example, corresponding to different views of an object. Examples of objects include a table, a house, a tree, a car, or other physical object. Example views include a frontal view, a view from above, one or more side views, a view from behind, or other view of the object.

In a first stage, the scene representation model 119 generates, using the point cloud generation model 210, a neural point cloud 201 based on the input images 102. The point cloud generation model 210 is configured to generate, from the input images 102, the neural point cloud 201 representing the 3D scene 103. In certain embodiments, neural points in the neural point cloud are assigned a location, a point confidence value, and neural features based on the input images 102. The point confidence value describes whether a neural point is near a surface of an object within the 3D scene. Neural features encode local 3D scene content and are generated based on features of the input images 102. In certain embodiments, the point cloud generation model 210 generates a set of point clouds for a set of views and combines the point clouds (corresponding to the views) into a point cloud 201 for the 3D scene 103. An example method for generating the neural point cloud 201 using the point cloud generation model 210 is described in FIG. 4 herein and an illustration of generation of a neural point cloud 201 is depicted in FIG. 5 herein.

In a second stage, the scene representation model 119 renders, using the point-based neural rendering model 215 and based on the neural point cloud 201, a view 104 of a 3D scene 103 corresponding to an input view coordinate 202. In some instances, the input view coordinate 202 defines a location and orientation of a camera within the 3D scene 103. In some examples, the input view coordinate 202 is a default view (e.g. a frontal view of the object from a camera ten meters away from the object within the 3D scene 103). In other examples, the input view coordinate 202 is defined by a user of the user computing device 120.

In certain examples, generating an output image defining the view 104 of the 3D scene 103 involves, for each pixel of an output 2D image corresponding to the view 104, conducting ray marching and inferring a red-green-blue ("RGB") color value for the pixel based on sampled shading points along the ray where neural points occur within a neighborhood (e.g. within a threshold radius of) the shading point location. For example, the neighborhood comprises a sphere centered at the shading point p with a fixed radius. For each shading point p, the point-based rendering model 215 queries at most K neural point neighbors $q_i, \ldots q_K$, aggregates the neural point features to get embeddings e of the shading pointp, and decodes the embeddings to get color c and density σ, as follows:

$$f(p,q)=F_i(f,p-q) \quad (1),$$

$$g(p)=X(f(p,q_1), \ldots, f(p,q_K)) \quad (2),$$

$$e=F_e(g(p)) \quad (3),$$

$$c=F_c(e) \quad (4),$$

$$\sigma=F_Q(e,v) \quad (5),$$

where f represents the features of a neural point p, a local geometry network $F_i$ generates the features of the neural point considering the relative position p-q against the shading pointp and X represents a weighting function. The volume density σ is a probability of the ray terminating at the location corresponding to the shading point. In some instances, the weighting function is an inverse of the euclidean distance, an inverse of the euclidean square distance, an average operator, or learned multilayer perceptrons ("MLPs").

Figure 7:
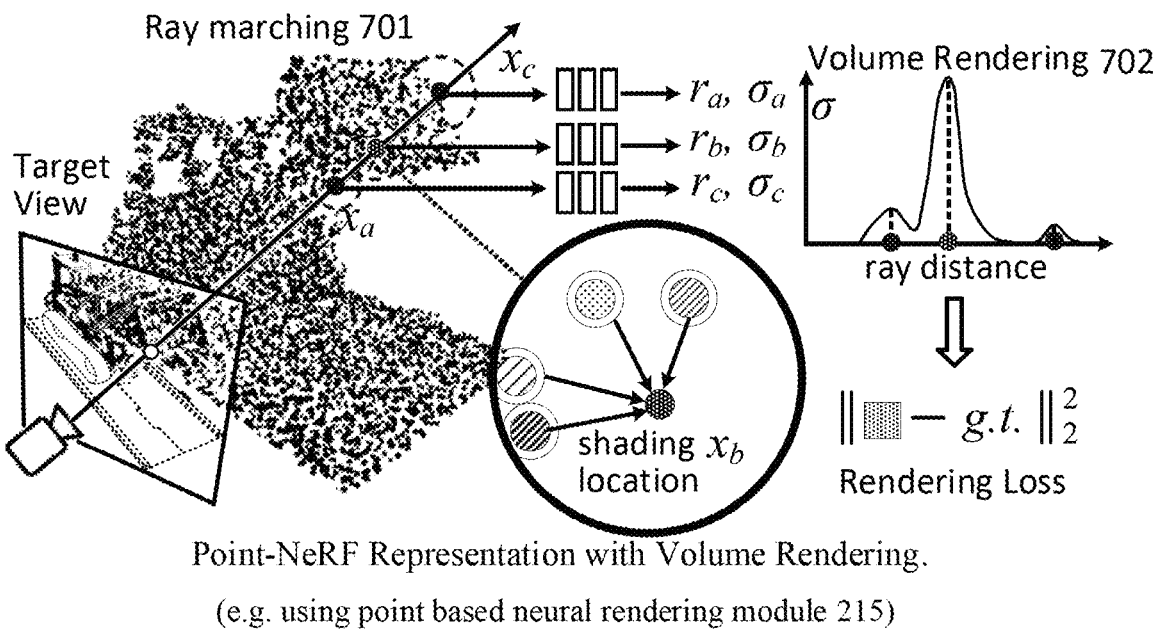
FIG. 7 depicts an illustration of rendering an output image depicting a view of a 3D scene using the method of FIG. 6, according to certain embodiments disclosed herein.
Figure 8:
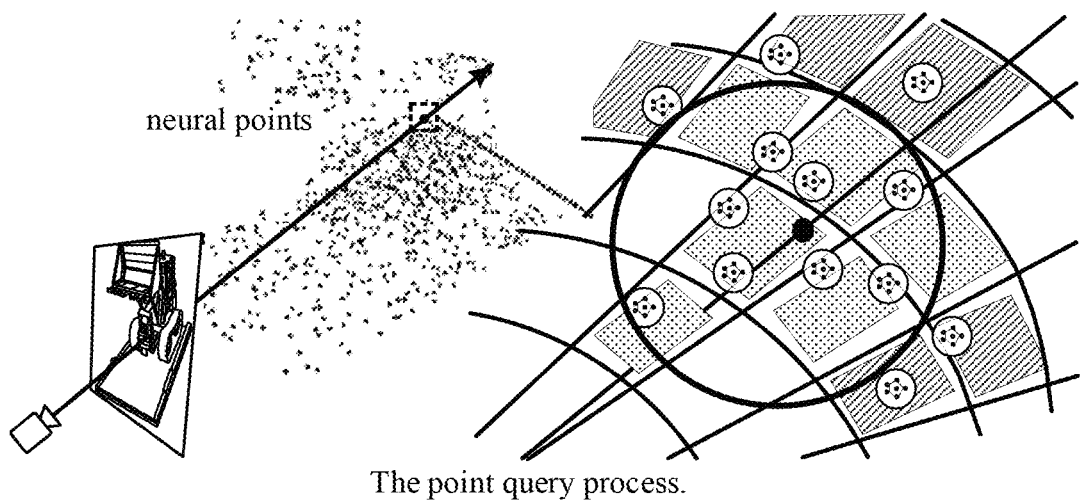
FIG. 8 depicts an illustration for aggregating neural point features for a shading point, which can be used in the method described in FIG. 6, according to certain embodiments disclosed herein.

An example method for rendering, by the point-based neural rendering model 215, an output image defining a view 104 of a 3D scene 103 based on the neural point cloud 201 is described in FIG. 6 herein. FIG. 7 depicts an illustration of rendering an output image depicting a view of a 3D scene using the method of FIG. 6. Further details about determining which neural points are within a neighborhood of a shading point p are depicted in FIG. 8.

As depicted in FIG. 2, the point-based neural rendering model 215 is configured to determine a view 104 based on an input view coordinate 202, using the neural point cloud 201 generated by the point cloud generation model 210. For example the point-based neural rendering model 215 generates a view 104 of a 3D scene 103 corresponding to an input view coordinate 202. As depicted in FIG. 2, the scene representation model 119 is configured to determine a volume rendering loss 203 based on the 3D scene view 104 and a ground truth image representing a ground truth view corresponding to the input view coordinate 202. For example, the ground truth image is an input image 202. In certain embodiments, the scene modeling system 110, during a training phase, updates one or more parameters of the scene representation model 119 based on the volume rendering loss 203. In some embodiments, the model training subsystem 116 trains, during the training phase, the point cloud generation model 210 along with the point-based neural rendering model 215. Further details about training the scene representation model 119 are described in FIG. 9.

Figure 3:
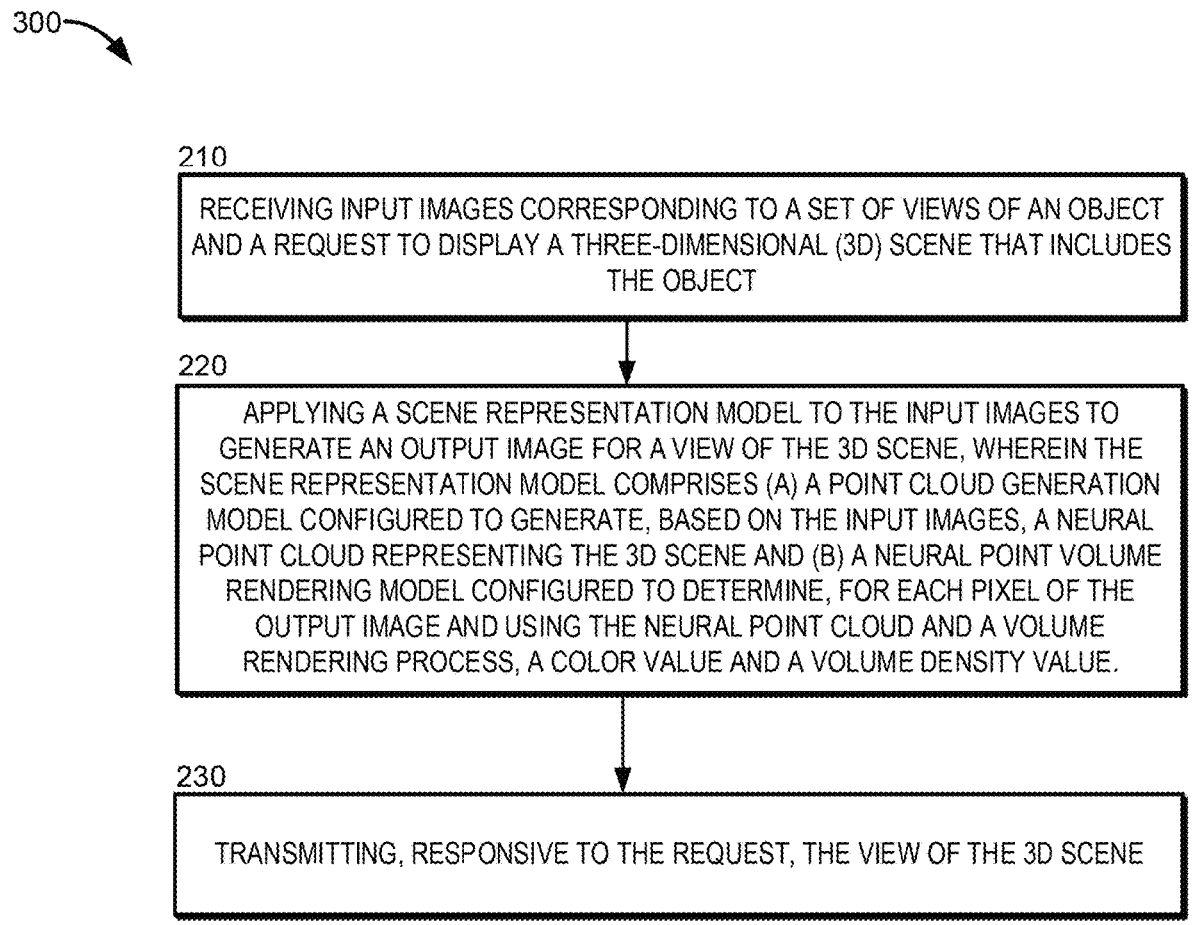
FIG. 3 depicts a method for generating, based on input images and using a scene representation model of FIG. 2, a three-dimensional scene, according to certain embodiments disclosed herein.

Examples of Computer-Implemented Operations for Generating Based on Input Images and Using a Scene Representation Model, a Three-Dimensional Scene FIG. 3 depicts an example of a process for generating, based on input images 102 and using a scene representation model 119, a three-dimensional scene 103. One or more computing devices (e.g., the scene modeling system 110 or the individual subsystems contained therein) implement operations depicted in FIG. 3. For illustrative purposes, the process 300 is described with reference to certain examples depicted in the figures. Other implementations, however, are possible.

At block 310, the method 300 involves receiving input images 102 corresponding to a set of views of an object and a request to display a 3D scene 103 that includes the object. In an embodiment, the user computing device 120 transmits the input images 102 via the network 130. In certain embodiments, the scene representation subsystem 114 receives the input images 102. For example, the user captures, via a camera device of the user computing device 120, or otherwise selects from a data storage unit 125 of the user computing device 120, the input images 102. In certain embodiments, the user interacts with a scene modeling application 121 to capture the input images 102 and/or otherwise select stored input images 102. The scene modeling application 121 (or web browser application) is configured to transmit, to the scene modeling system 110, a request to provide a view 104 of a 3D scene 103 based on the input images 102 responsive to receiving inputs from the user and to display the view 104 generated by the scene modeling system 110. In some instances, the input images 102 correspond to one or more images of an object taken from various locations and/or camera angles. In some instances, the view 104 is a predefined view including a predefined camera location and camera viewing angle within the 3D scene 103. In some instances, the scene representation subsystem 114 further receives, along with or subsequently to receiving the input images 102, a view coordinate defining a requested view 104 of the 3D scene 103.

At block 320, the method 300 involves applying a scene representation model 119 to the input images 102 to generate an output image for a view 104 of the 3D scene 103, wherein the scene representation model 119 is configured to (a) generate, based on the input images 102 a neural point cloud 201 representing the 3D scene 103 and (b) determine, for each pixel of the output image and using the neural point cloud 201 and a volume rendering process, a color value. In some embodiments, the method 300 involves applying the scene representation model 119 described in FIG. 2 to the set of input images 102 to generate the view 104. In some instances, the scene representation model 119 generates an output image corresponding to the predefined view 104. In some instances, the scene representation model 119 generates an output image corresponding to the requested view 104 of the 3D scene 103 defined by the view coordinate. In certain embodiments, applying the scene representation model 119 includes generating a neural point cloud 201 from the input images 102 using the point cloud generation model 210, as described in FIG. 4 herein and rendering an output image defining the view 104 of a 3D scene 103 based on the neural point cloud 201 using a differentiable ray marching and volume rendering process, as described in FIG. 6 herein.

At block 330, the method 300 involves transmitting, by the scene modeling system 110 and responsive to the request, the view 104 of the 3D scene 103. For example, the scene representation subsystem 114 transmits view 104 (e.g. the output image defining the view 104) to the system from which the request to generate the 3D scene was received (e.g. the user computing device 120). In some embodiments, the scene representation subsystem 114 stores the view 104 in the data store 111, which is accessible to the user computing device 120, and the user computing device 120 accesses the view 104 via the network 130. In some embodiments, the scene representation subsystem 114, or the user computing device 120 to which the view 104 is transmitted, modifies features of an online computing environment based on the view 104 generated by the scene representation model 119 for the input images 102. In some instances, modifying the features of the online computing environment include presenting, in a user interface 123 (e.g. via a scene modeling application 121 hosted by the user computing device 120) the view.

In certain examples, the user defines the initial view 104 via the scene modeling application 121 and receives the defined view 104 of the 3D scene 103 from the scene representation subsystem 114. The user requests subsequent views 104 by selecting one or more user interface 123 objects. For example, the user may define the camera location and camera view angle by entering values into one or more fields (e.g. the user enters x, y, z axis locations for the camera and additional coordinates for the viewing angle of the camera. In another example, the user may define and/or change a view in the 3D scene via a live scene view by moving a virtual camera and/or changing a view angle of the virtual camera within the initial view 104 of the 3D scene to request a subsequent view 104. In these examples, the scene representation subsystem 114 generates a subsequent output image defining the subsequent view 104 of the 3D scene 103. For example, the scene representation subsystem 114, for each requested subsequent view 104 of the 3D scene 103, renders a subsequent output image defining the subsequent view 104 of a 3D scene 103 based on the neural point cloud 201, as described in FIG. 6.

Figure 4:
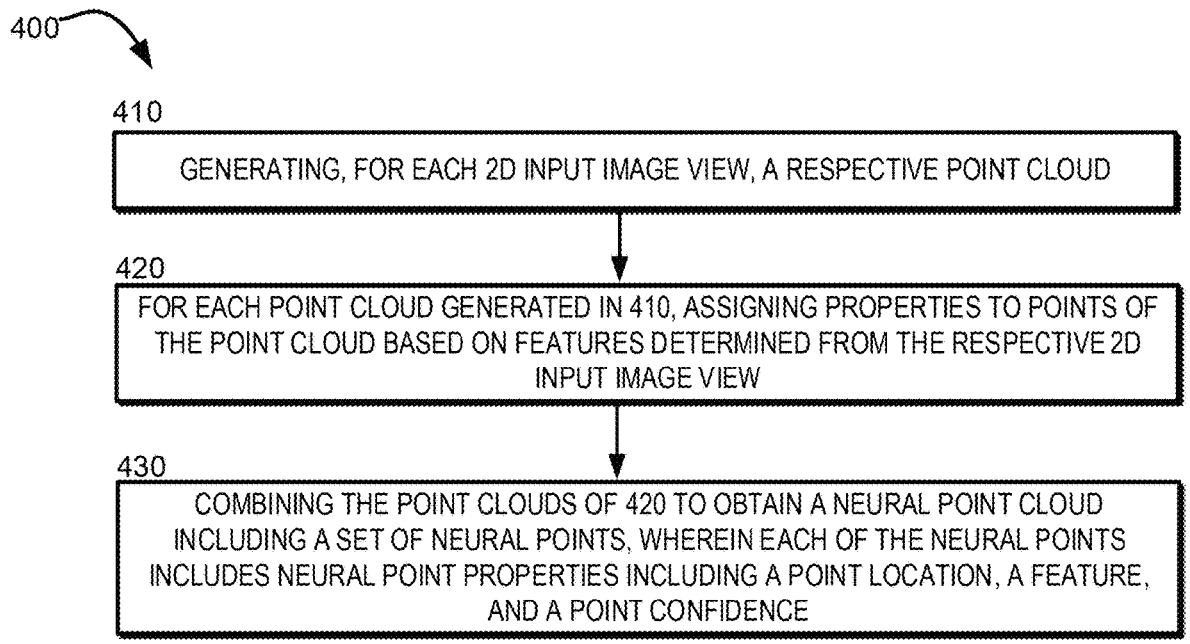
FIG. 4 depicts a method for generating a neural point cloud based on input images, according to certain embodiments disclosed herein.

FIG. 4 depicts an example of a method 400 for generating a neural point cloud 201 based on input images 102, according to certain embodiments disclosed herein. One or more computing devices (e.g., the scene modeling system 110 or one or more of the subsystems thereof) implement operations depicted in FIG. 4. For illustrative purposes, the process 400 is described with reference to certain examples depicted in the figures. Other implementations, however, are possible.

At block 410, the method 400 involves generating, for each 2D input image 102 view, a respective point cloud. The point cloud generation model 210, in some instances, uses deep learning multiview sterio ("MVS") method to generate 3D point locations using volume-based 3D convolutional neural networks ("CNNs"), which produce high-quality dense geometry and generalize well across domains. In an example, for each of input images 102 ($I_q$) with camera parameters $\Phi_q$ at viewpoint q, the point cloud generation model 120 uses a model (e.g. MVSNet) to build a plane-swept cost volume by warping 2D input image 102 features from neighboring viewpoints and then regressing depth probability volume using deep 3D CNNs. The point cloud generation model 210 computes a depth map by linearly combining per-plane depth values weighted by the depth probabilities. The point cloud generation model 210 unprojects the depth map to 3D space to get a point cloud $\{p_1, \ldots, p_{N_q}\}$ per view q. In some examples, since the depth probabilities describe a likelihood of the point being on a surface in the 3D scene 103, the point cloud generation model 210 tri-linearly samples the depth probability volume to obtain the point confidence value $\gamma_i$ at each point $p_i$. For example, obtaining the point confidence value at each point can be represented as:

$$\{p_i, \gamma_i\} = G_{p,\gamma}(I_q, \Phi_q, I_{q1}, \Phi_{q1}, I_{q2}, \Phi_{q2}, \ldots) \tag{6},$$

where $G_{p,\gamma}$ represents the MVSNet-based network, $I_{q1}, \Phi_{q1}, \ldots$ are additional neighboring views used in the used in the MVS reconstruction. In some embodiments, the point cloud generation model 210 uses two additional neighboring views for the MVS reconstruction. However, other quantities of additional neighboring views may be used.

At block 420, the method 400 involves assigning, for each point cloud generated in block 410, properties to points of the point cloud based on features determined from the respective 2D input image 102 view. In certain examples, the point cloud generation model 210 uses a 3D convolutional neural network ("CNN") to extract 2D image feature maps from each input image 102 ($I_q$). In certain embodiments, the CNN is a a visual geometry group ("VGG") network. In some instances, the 2D image feature maps may include a high-level description of edges, corners, or other features of a 2D image.

At block 430, the method 400 involves combining the point clouds of block 420 to obtain a neural point cloud 201 including a set of neural points, wherein each of the neural points includes neural point properties including a point location, a feature, and a point confidence. The point cloud generation model 210 aligns the feature maps with the point depth prediction from the MVSNet-based network and predicts per-point features as:

$$\{f_i\} = G_f(I_q) \tag{7}.$$

In some embodiments, each neural point has 32 channels (or other predefined number of channels) of local features. In some embodiments, the per-point processing network $G_f$ has a VGG network architecture having three downsampling layers. The point cloud generation model 210 combines intermediate features at different resolutions as $f_i$, which provides a point description that models multi-scale scene appearance. The point cloud generation model 210 combines point clouds from multiple viewpoints to obtain a final neural point cloud 201. For example, the point cloud generation model 210 represents the neural point cloud 201 as $P = \{(p_i, f_i, \gamma_i) | i=1, \ldots, N\}$, where each point i is located at $p_i$ and associated with a neural feature vector $f_i$ that encodes the local 3D scene 103 content. In some instances, the point cloud generation model 210 assigns each point in the neural point cloud 201 a scale confidence value $\gamma_i \in [0,1]$ that represents how likely the respective point is located near an actual scene surface (e.g. a surface of the object that is the subject of the input images 102).

FIG. 5 depicts an example illustration 500 of generating a neural point cloud 201 based on input images 102, using the method of FIG. 4, according to certain embodiments disclosed herein. For illustrative purposes, the illustration 500 is described with reference to certain examples depicted in the figures. Other implementations, however, are possible. As shown FIG. 5, from multi-view images, the point cloud generation model 210 generates a depth map for each view by using 3D CNNs (depicted as $G_{p,\gamma}$) and extracts 2D features (depicted as $f_i$) from the input images by a 2D CNN (depicted as $G_f$). As depicted in FIG. 5, after aggregating the depth maps to generate a point cloud, the point cloud generation model 210 generates a neural point cloud, which is a point-based radiance field in which each neural point has a spatial location $p_i$, a confidence value $\gamma_i$, and neural feature vector $f_i$. The confidence value, as previously discussed, represents a probability of the neural point being located near a surface of an object within the 3D scene 103.

FIG. 6 depicts an example of a method 600 for rendering an output image depicting a view 104 of a 3D scene 103, according to certain embodiments disclosed herein. One or more computing devices (e.g., the scene modeling system 110 or one or more of the subsystems thereof) implement operations depicted in FIG. 6. For illustrative purposes, the method 600 is described with reference to certain examples depicted in the figures. Other implementations, however, are possible.

At block 610, the method 600 involves receiving a requested view 104 for the 3D scene 103. The point-based neural rendering model 215 is configured to conduct, using the neural point cloud 201, point-based neural rendering to generate a view of the 3D scene 103. The view 104 is defined by view coordinates for example, a camera position within the 3D scene 103 and a viewing direction for the camera. The point-based neural rendering model 215 transforms the neural point cloud 201 to the view coordinates. For example, the neural point cloud includes, for each neural point, a location, a point confidence value, and neural features. Transforming the neural point cloud 201 involves changing the location data of each neural point to correspond to the view coordinates defining the view 104. In some instances, transforming the neural point cloud 201 involves changing a location of each neural point within the original view coordinates to correspond to the requested view.

At block 620, the method 600 involves determining, for each pixel of an output image for the requested view 104, a set of shading points along a ray projected though the neural point cloud 201 representing the 3D scene 103.

In certain embodiments, implementing block 620 includes implementing sub-blocks 621, 623, 625, and 627 for each pixel of the output image defining the view 104. In certain embodiments, for each pixel of an output 2D image defining a view 104 of the 3D scene, the point-based neural rendering model 215 accumulates a radiance, using M shading points at $\{x_j | j=1, \ldots, M\}$ along a ray, using volume density, as:

$$c = \sum_M \tau_j (1 - \exp(-\sigma_j \Delta_j)) r_j, \quad (8)$$

$$\tau_j = \exp\left(-\sum_{t=1}^{j-1} \sigma_t \Delta_t\right), \quad (9)$$

Where c represents a color value (e.g. an RBG color value), $\tau_j$ represents volume transmittance, $\sigma_j$ and $r_j$ are the volume density and radiance for each shading point j at $x_j$, and $\Delta_t$ is the distance between adjacent shading points. The radiance field represents the volume density a and view-dependent radiance r at any 3D location within the 3D scene 103. The point-based neural rendering model 215 utilizes the neural point cloud 201 generated by the point cloud generation model 210 to compute the volume properties. In certain embodiments, implementing block 620 includes implementing, in parallel, sub-blocks 621, 623, 625, and 627 for each of a set of pixels of the output image defining the view 104.

At sub-block 621, the method 600 involves projecting, for a pixel of the output image, a ray through the neural point cloud 201.

At sub-block 623, the method 600 involves selecting a set of shading points along the ray. The point-based neural rendering model 215 is configured to query, given any 3D location x (e.g. a shading point along the ray) within the 3D scene 103, K neighboring neural points around the location x within a certain radius R. The point-based neural rendering model 215 represents a point-based radiance field as a neural module that regresses volume density- and view-dependent radiance r along any viewing direction d at any shading location x from neighboring neural points of the neural point cloud 201 as:

$$(\sigma, r) = \text{PointNeRF}(x, d, p_1, f_1, \gamma_1, \ldots, p_K, f_K, \gamma_K). \quad (10)$$

In certain embodiments, the point-based neural rendering model 215 performs the regression using a PointNet-like neural network including sub-multilayer perceptrons ("sub MLPs"). In certain embodiments, the point cloud generation model 210 processes each neighboring neural point and aggregates multi-point information to obtain a final estimate of a shading point. To process each neighboring neural point, the point-based neural rendering model 215 uses an MLP to predict a new feature vector, as follows:

$$f_{i,p} = F(f_i, p - q_i) \quad (11),$$

where F represents the MLP, p represents a shading location, and $f_i$ encodes a local 3D scene content around neural point location $q_i$. The MLP network expresses a local 3D function that outputs a specific neural scene description $f_{i,p}$ at p, modeled by the neural point in its local frame. In certain embodiments, the usage of relative position p-q makes the network invariant to point translation for better generalization.

At sub-block 625, the method 600 involves determining, for each selected shading point, shading point features by aggregating neural point properties of neural points within a radius of the shading point. Shading point features include a shading point color value (radiance) and a shading point density value. In certain embodiments, the point-based neural rendering model 215 uses an inverse distance weighting method to aggregate the neural features $f_i$, regressed from K neighboring neural points to obtain a single feature $f_p$ that describes scene appearance at p:

$$f_p = \sum_i \gamma_i \frac{\omega_i}{\sum \omega_i} f_{i,p}, \omega_i = \frac{1}{\|q_i - p\|}, \quad (12)$$

where $\omega_i$ represents an inverse-distance weight and $\gamma_i$ represents a per-point confidence value. The point-based neural rendering model 215 leverages the inverse-distance weight to aggregate neural features, making neural points which are closer to the shading point contribute more to the shading point features computation than neural points which are farther away from the shading point.

At sub-block 627, the method 600 involves determining whether the output image includes additional pixels for which the scene representation subsystem 114 has not performed sub-blocks 621, 623, and 625. For example, the output image comprises a 1920×1080 pixel image, a 1280× 720 pixel image, a 1080×1080 pixel image, or other image size and the scene representation system 114 applies sub-blocks 621, 623, and 625 to determine shading points and associated shading point features (e.g. a shading point color value and a shading point density value for each shading point) for each of the individual pixels of the output image.

If the output image includes additional pixels for which sub-blocks 621, 623, and 625 have not been performed, the method 600 returns to sub-block 621. For example, the scene representation subsystem 114 repeats sub-blocks 621, 623, and 625 for each remaining pixel of the output image defining the view 104 to obtain data necessary to generate the output image defining the view 104 in blocks 630 and 640. In certain embodiments, repeating sub-blocks 621, 623, and 625 involves performing sub-blocks 621, 623, and 625 for one or more sets of remaining pixels in parallel. In certain embodiments, repeating sub-blocks 621, 623, and 625 involves performing sub-blocks 621, 623, and 625 one remaining pixel at a time for the remaining pixels.

Returning to sub-block 627, if the output image does not include additional pixels, the method 600 proceeds to block 630. For example, the scene representation subsystem 114 determines that shading point features have been determined, via sub-blocks 621, 623, and 625, for each pixel of the set of pixels defining an output image for the requested view 104.

At block 630, the method 600 involves determining, for each pixel of the output image for the requested view 104, a color value via volume rendering the respective set of shading points. The point-based neural rendering model 215 uses an MLP to regress the view-dependent radiance (color value) for a shading point from the single feature $f_p$ given a viewing direction:

$$r = R(f_p, d) \quad (13),$$

where R represents the MLP and d represents the viewing direction. In certain embodiments, the point-based neural rendering model 215 regresses a density per point using an MLP and then performs an inverse distance-based weighting to determine a volume density for a shading point, as follows.

$$\sigma_i = T(f_{i,p}), \quad (14)$$

$$\sigma = \sum_i \sigma_i \gamma_i \frac{\omega_i}{\sum \omega_i}, \omega_i = \frac{1}{\|q_i - p\|}, \quad (15)$$

where T represents the MLP, $\sigma_i$ represents a density per neural point, and a represents the volume density at p. Accordingly, each neural point directly within a radius of a shading point contributes to the volume density a associated with the shading point and point confidence $\gamma_i$ is explicitly associated with this contribution. The color value for a pixel can be determined based according to Equations (8) and (9) for a set of shading points along a ray projected through the pixel. Specifically, the color value of the pixel is determined based on a density and color value determined for each of the set of shading points.

At block 640, the method 600 involves rendering the output image for the requested view 104 based on the color values determined for the pixels in block 630. For example, the scene representation subsystem 114 determines, for each pixel of the output image defining the view 104 of the 3D scene 103, a color value and generates the output image by associating the determined color value with each pixel. In certain examples, the scene representation subsystem 114 generates an image file which defines the color values for the pixels of the output image. In certain examples, the scene representation subsystem 114 transmits the image file to the user computing device 120 via the network 130, which displays the output image via the user interface 123.

FIG. 7 depicts an example illustration of rendering an output image depicting a target view of a 3D scene using the method of FIG. 6 and using the neural point cloud illustrated in FIG. 5, according to certain embodiments disclosed herein. As shown in FIG. 7, the point based neural rendering model 215 synthesizes a novel view 104 of a 3D scene 103, using the neural point cloud illustrated in FIG. 5. As depicted in FIG. 7, the point based neural rendering model 215 performs differentiable ray marching 701, which involves computing shading points (depicted as $x_a$, $x_b$, $x_c$) only at locations which include neural points within a radius (e.g. depicted as a dotted line radiii in FIG. 7) of the shading point. At each shading point, the point based neural rendering model 215 aggregates features of the shading point from K neural point neighbors and computes a radiance (color value, depicted as $r_a$, $r_b$, $r_c$) and volume density (depicted as $\sigma_a$, $\sigma_b$, $\sigma_c$) for the respective shading point (e.g. using an MLP network). The point based neural rendering model 215 performs volume rendering 702 to determine a color value for the pixel based on the volume density and color value of each of the shading points. The point based neural rendering model 215 determines a rendering loss by comparing a pixel color value determined via volume rendering 702 against a ground truth pixel color value. For example, the ground truth pixel color value corresponds to a pixel of one of the input images corresponding to various viewpoints of the 3D scene 103.

FIG. 8 depicts an example illustration for aggregating neural point features for a shading point, which can be used in the method described in FIG. 6, according to certain embodiments disclosed herein. As shown in FIG. 8, the point based neural rendering model 215 constructs a grid index and identifies grids within the grid index which include neural points (e.g. shaded grids in FIG. 8) and which cross the ray projected through the 3D scene. Shading points can be placed inside grids comprising neural points which the ray also crosses. For a shading point along the ray, the point based neural rendering model 125 identifies neural points within a radius (indicated by a dotted line radius) of the shading point (indicated as a solid point). In certain embodiments, the point based neural rendering model 125 retrieves information (point location, neural features, confidence value) associated with each neural point within the radius of the shading point based on their location within the grid index.

Examples of Computing Environments for Implementing Certain Embodiments

Figure 9:
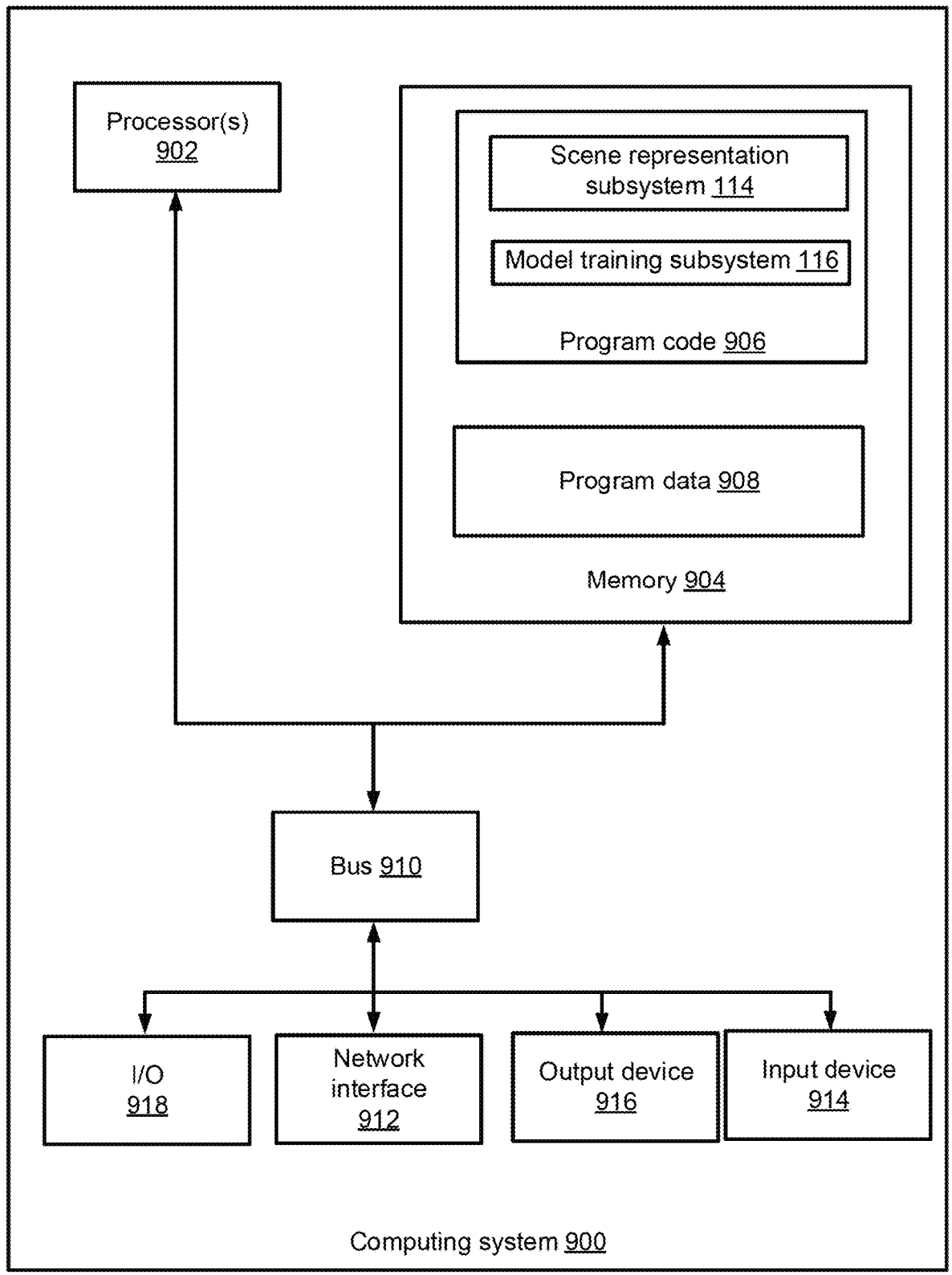
FIG. 9 depicts an example of a computing system that performs certain operations described herein, according to certain embodiments described in the present disclosure.

Any suitable computer system or group of computer systems can be used for performing the operations described herein. For example, FIG. 9 depicts an example of a computer system 900. The depicted example of the computer system 900 includes a processing device 902 communicatively coupled to one or more memory components 904. The processing device 902 executes computer-executable program code stored in a memory components 904, accesses information stored in the memory component 904, or both. Execution of the computer-executable program code causes the processing device to perform the operations described herein. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory components 904 includes any suitable non-transitory computer-readable medium for storing program code 906, program data 1008, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory components 404 can be volatile memory, non-volatile memory, or a combination thereof.

The computer system 900 executes program code 906 that configures the processing device 902 to perform one or more of the operations described herein. Examples of the program code 906 include, in various embodiments, the scene modeling system 110 (including the scene representation subsystem 114 and the model training subsystem 116 described herein) of FIG. 1, which may include any other suitable systems or subsystems that perform one or more operations described herein (e.g., one or more neural networks, encoders, attention propagation subsystem and segmentation subsystem). The program code 906 may be resident in the memory components 904 or any suitable computer-readable medium and may be executed by the processing device 902 or any other suitable processor.

The processing device 902 is an integrated circuit device that can execute the program code 906. The program code 906 can be for executing an operating system, an application system or subsystem, or both. When executed by the processing device 902, the instructions cause the processing device 902 to perform operations of the program code 906. When being executed by the processing device 902, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 904 store the program data 708 that includes one or more datasets described herein. In some embodiments, one or more of data sets are stored in the same memory component (e.g., one of the memory components 904). In additional or alternative embodiments, one or more of the programs, data sets, models, and functions described herein are stored in different memory components 904 accessible via a data network. One or more buses 910 are also included in the computer system 900. The buses 910 communicatively couple one or more components of a respective one of the computer system 900.

In some embodiments, the computer system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computer system 900 is able to communicate with one or more other computing devices via a data network using the network interface device 912.

The computer system 900 may also include a number of external or internal devices, an input device 914, a presentation device 916, or other input or output devices. For example, the computer system 900 is shown with one or more input/output ("I/O") interfaces 918. An I/O interface 918 can receive input from input devices or provide output to output devices. An input device 914 can include any device or group of devices suitable for receiving visual, auditory, or other suitable input that controls or affects the operations of the processing device 902. Non-limiting examples of the input device 914 include a touchscreen, a mouse, a keyboard, a microphone, a separate mobile computing device, etc. A presentation device 916 can include any device or group of devices suitable for providing visual, auditory, or other suitable sensory output. Non-limiting examples of the presentation device 916 include a touchscreen, a monitor, a speaker, a separate mobile computing device, etc.

Although FIG. 9 depicts the input device 914 and the presentation device 916 as being local to the computer system 900, other implementations are possible. For instance, in some embodiments, one or more of the input device 914 and the presentation device 916 can include a remote client-computing device that communicates with computing system 900 via the network interface device 912 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 10:
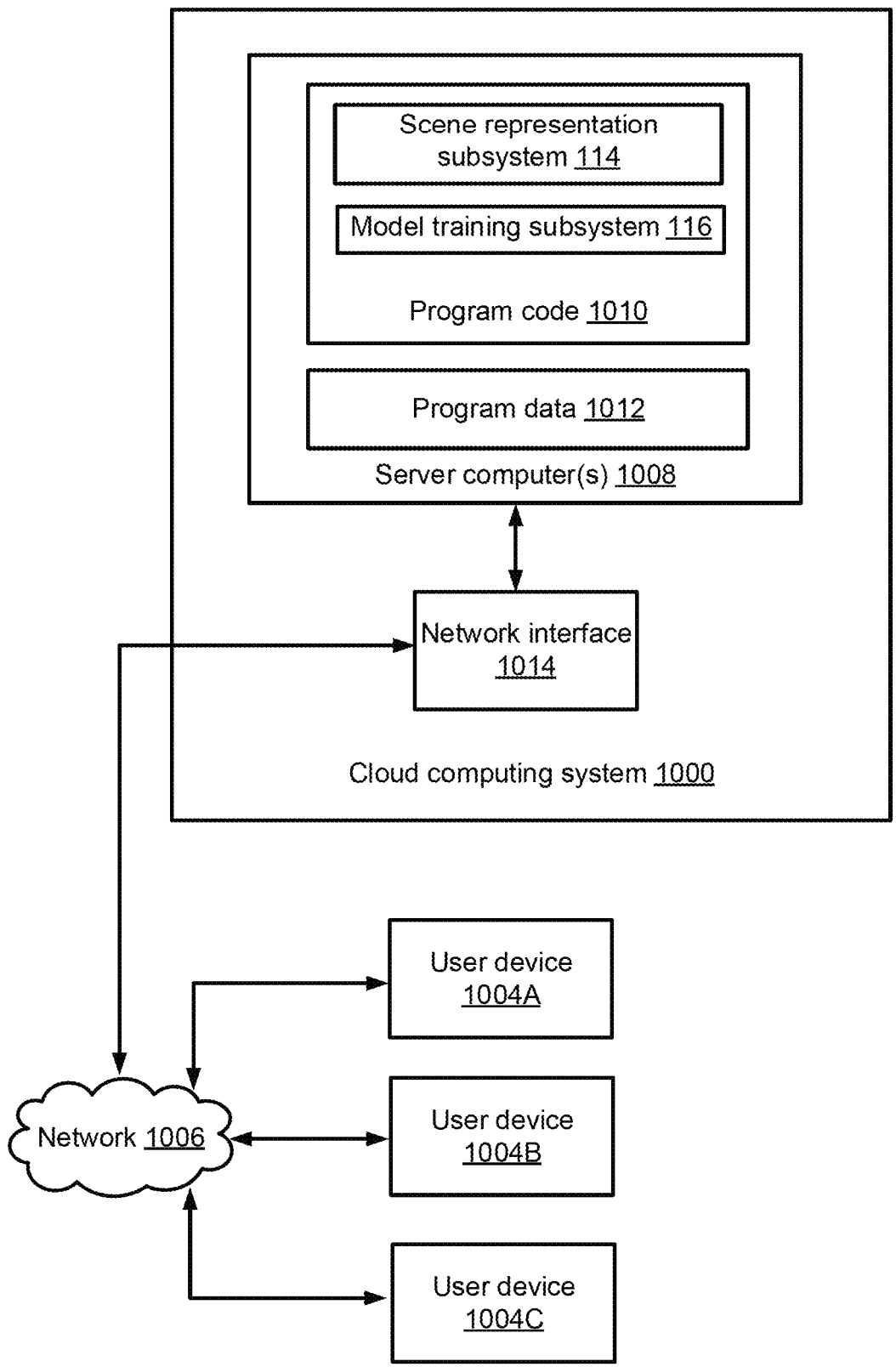
FIG. 10 an example of a cloud computing system that performs certain operations described herein, according to certain embodiments described in the present disclosure.

In some embodiments, the functionality provided by computer system 900 may be offered as cloud services by a cloud service provider. For example, FIG. 10 depicts an example of a cloud computer system 1000 offering a service for providing a view 104 of a 3D scene 103 based on input images 102, that can be used by a number of user subscribers using user devices 1004A, 1004B, and 1004C across a data network 1006. In the example, the service for providing a view 104 of a 3D scene 103 based on input images 102 may be offered under a Software as a Service (SaaS) model. One or more users may subscribe to the service for providing a view 104 of a 3D scene 103 based on input images 102, and the cloud computer system 1000 performs the processing to provide the service for providing a view 104 of a 3D scene 103 based on input images 102. The cloud computer system 1000 may include one or more remote server computers 1008.

The remote server computers 1008 include any suitable non-transitory computer-readable medium for storing program code 1010 (e.g., the scene representation subsystem 114 and the model training subsystem 116 of FIG. 1) and program data 1012, or both, which is used by the cloud computer system 1000 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 1008 can include volatile memory, non-volatile memory, or a combination thereof.

One or more of the server computers 808 execute the program code 1010 that configures one or more processing devices of the server computers 1008 to perform one or more of the operations that provide views 104 of a 3D scene 103 based on input images 102. As depicted in the embodiment in FIG. 10, the one or more servers providing the services for providing a view 103 of a 3D scene 103 based on input images 102 may implement the scene representation subsystem 114 and the model training subsystem 116. Any other suitable systems or subsystems that perform one or more operations described herein (e.g., one or more development systems for configuring an interactive user interface) can also be implemented by the cloud computer system 1000.

In certain embodiments, the cloud computer system 1000 may implement the services by executing program code and/or using program data 1012, which may be resident in a memory component of the server computers 1008 or any suitable computer-readable medium and may be executed by the processing devices of the server computers 1008 or any other suitable processing device.

In some embodiments, the program data 1012 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 1006.

The cloud computer system 1000 also includes a network interface device 1014 that enable communications to and from cloud computer system 1000. In certain embodiments, the network interface device 1014 includes any device or group of devices suitable for establishing a wired or wireless data connection to the data networks 1006. Non-limiting examples of the network interface device 1014 include an Ethernet network adapter, a modem, and/or the like. The service for providing views 104 of a 3D scene 103 based on input images 102 is able to communicate with the user devices 1004A, 1004B, and 1004C via the data network 1006 using the network interface device 1014.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method, comprising:
   receiving a plurality of input two-dimensional (2D) images corresponding to a plurality of views of an object and a request to display a three-dimensional (3D) scene that includes the object;
   generating an output 2D image for a view of the 3D scene by applying a scene representation model to the input 2D images, wherein the scene representation model comprises:
      a point cloud generation model configured to generate, based on the input 2D images, a neural point cloud representing the 3D scene;
      a neural point volume rendering model configured to determine, for each pixel of the output 2D image and using the neural point cloud and a volume rendering process, a color value using a shading point color value and a density value of each shading point of a plurality of shading points, the shading point color value and the density value based on features of one or more neural points located a predefined proximity to the shading point; and
   transmitting, responsive to the request, the output 2D image, wherein each pixel of the output 2D image includes the respective determined color value.

2. The method of claim 1, wherein the neural point cloud comprises a plurality of neural points, wherein generating the neural point cloud comprises assigning, to each neural point of the plurality of neural points, a location, a confidence value representing a probability that the location is within a proximity to a surface of the object within the 3D scene, and a feature representing an appearance of the 3D scene at the location.

3. The method of claim 1, wherein determining, for each pixel of the output 2D image, the color value comprises:
   for each pixel of the output 2D image:
      projecting a ray through the pixel into the neural point cloud representing the 3D scene; and
      selecting the plurality of shading points along the ray, each of the plurality of shading points being located within the predefined proximity of the one or more neural points of the neural point cloud.

4. The method of claim 3, wherein determining the shading point color value and the shading point density value comprises:
   for each neural point of the one or more neural points located within the predefined proximity to the shading point, applying a first multilayer perceptron to determine a point-specific feature vector; and
   applying a second multilayer perceptron to the point-specific feature vectors to determine the shading point color value and the shading point density value.

5. The method of claim 1, wherein generating the neural point cloud comprises:
   generating, for each input 2D input image, a view-specific point cloud associated with a respective view associated with the input 2D image of the plurality of views; and
   combining the view-specific point clouds to generate the neural point cloud.

6. The method of claim 5, wherein generating the neural point cloud further comprises:
   extracting, for each of the plurality of input 2D images, a 2D image feature map; and
   for each view-specific point cloud, assigning properties to points of the view-specific point cloud based on properties determined from the extracted 2D image feature maps,
   wherein the features of the neural point cloud are determined based on the properties assigned to the points of the view-specific point clouds.

7. The method of claim 1, wherein view coordinates including a position within the 3D scene and a camera viewing angle define the view.

8. A system comprising:
   a memory component; and
   a processing device coupled to the memory component, the processing device to perform operations comprising:
      generating an output two-dimensional (2D) image for a view of a three-dimensional (3D) scene including an object by applying a scene representation model to a plurality of input 2D images corresponding to a plurality of views of the object, wherein the scene representation model comprises:
         a point cloud generation model configured to generate, based on the input 2D images, a neural point cloud representing the 3D scene;

a neural point volume rendering model configured to determine, for each pixel of the output image and using the neural point cloud and a volume rendering process, a color value using a shading point color value and a density value of each shading point of a plurality of shading points, the shading point color value and the density value based on features of one or more neural points located a predefined proximity to the shading point; and
generating the output 2D image, wherein each pixel of the output 2D image includes the respective determined color value.

9. The system of claim 8, the operations further comprising:
receiving, from a user computing device, the plurality of input 2D images and a request to display a three-dimensional (3D) scene that includes the object; and
transmitting, responsive to the request, the output 2D image to the user computing device.

10. The system of claim 9, wherein view coordinates including a position within the 3D scene and a camera viewing angle define the view, the operations further comprising:
receiving, from the user computing device, the view coordinates; and
transforming the neural point cloud based on the view coordinates, wherein the volume rendering process is performed using the transformed neural point cloud.

11. The system of claim 8, wherein determining, for each pixel of the output 2D image, the color value comprises:
for each pixel of the output 2D image:
projecting a ray through the pixel into the neural point cloud representing the 3D scene; and
selecting the plurality of shading points along the ray, each of the plurality of shading points being located within the predefined proximity of the one or more neural points of the neural point cloud.

12. The system of claim 11, wherein determining the shading point color value and the shading point density value comprises:
for each neural point of the one or more neural points located within the predefined proximity to the shading point, applying a first multilayer perceptron to determine a point-specific feature vector; and
applying a second multilayer perceptron to the point-specific feature vectors to determine the shading point color value and the shading point density value.

13. The system of claim 8, wherein generating the neural point cloud comprises:
generating, for each input 2D input image, a view-specific point cloud associated with a respective view associated with the input 2D image of the plurality of views; and
combining the view-specific point clouds to generate the neural point cloud.

14. The system of claim 13, wherein generating the neural point cloud further comprises:
extracting, for each of the plurality of input 2D images, a 2D image feature map; and
for each view-specific point cloud, assigning properties to points of the view-specific point cloud based on properties determined from the extracted 2D image feature maps,
wherein the features of the neural point cloud are determined based on the properties assigned to the points of the view-specific point clouds.

15. A non-transitory computer-readable medium storing executable instructions, which when executed by a processing device, cause the processing device to perform operations comprising:
generating an output two-dimensional (2D) image for a view of a three-dimensional (3D) scene including an object by applying a scene representation model to a plurality of input 2D images corresponding to a plurality of views of the object, wherein the scene representation model comprises:
a point cloud generation model configured to generate, based on the input 2D images, a neural point cloud representing the 3D scene;
a neural point volume rendering model configured to determine, for each pixel of the output 2D image and using the neural point cloud and a volume rendering process, a color value using a shading point color value and a density value of each shading point of a plurality of shading points, the shading point color value and the density value based on features of one or more neural points located a predefined proximity to the shading point; and
generating the output 2D image, wherein each pixel of the output 2D image includes the respective determined color value.

16. The non-transitory computer-readable medium of claim 15, wherein determining, for each pixel of the output 2D image, the color value comprises:
for each pixel of the output 2D image:
projecting a ray through the pixel into the neural point cloud representing the 3D scene; and
selecting the plurality of shading points along the ray, each of the plurality of shading points being located within the predefined proximity of the one or more neural points of the neural point cloud.

17. The non-transitory computer-readable medium of claim 15, wherein determining the shading point color value and the shading point density value comprises:
for each neural point of the one or more neural points located within the predefined proximity to a shading point, applying a first multilayer perceptron to determine a point-specific feature vector; and
applying a second multilayer perceptron to the point-specific feature vectors to determine the shading point color value and the shading point density value.

18. The non-transitory computer-readable medium of claim 15, wherein generating the neural point cloud comprises:
generating, for each input 2D input image, a view-specific point cloud associated with a respective view associated with the input 2D image of the plurality of views; and
combining the view-specific point clouds to generate the neural point cloud.

19. The non-transitory computer-readable medium of claim 18, wherein generating the neural point cloud further comprises:
extracting, for each of the plurality of input 2D images, a 2D image feature map; and
for each view-specific point cloud, assigning properties to points of the view-specific point cloud based on properties determined from the extracted 2D image feature maps,
wherein the features of the neural point cloud are determined based on the properties assigned to the points of the view-specific point clouds.

20. The non-transitory computer-readable medium of claim 15, wherein view coordinates including a position within the 3D scene and a camera viewing angle define the view, the operations further comprising:
  receiving, from a user computing device, the plurality of input 2D images and a request to display a three-dimensional (3D) scene that includes the object; and
  transmitting, responsive to the request, the output 2D image to the user computing device.

* * * * *